(12) United States Patent
Jury

(10) Patent No.: US 11,242,099 B1
(45) Date of Patent: Feb. 8, 2022

(54) COLLAPSIBLE TRAILER

(71) Applicant: Kenneth Jury, Houston, TX (US)

(72) Inventor: Kenneth Jury, Houston, TX (US)

(*) Notice: Subject to any disclaimer, the term of this patent is extended or adjusted under 35 U.S.C. 154(b) by 365 days.

(21) Appl. No.: 16/401,187

(22) Filed: May 2, 2019

(51) Int. Cl.
*B62D 63/06* (2006.01)

(52) U.S. Cl.
CPC ......... *B62D 63/061* (2013.01); *B62D 63/062* (2013.01)

(58) Field of Classification Search
CPC .......................... B62D 63/061; B62D 63/062
See application file for complete search history.

(56) References Cited

U.S. PATENT DOCUMENTS

| | | | | | |
|---|---|---|---|---|---|
| 488,894 | A | * | 12/1892 | Hess | B62D 63/061 280/142 |
| 1,771,836 | A | * | 7/1930 | Beckham | B62B 3/02 280/640 |
| 1,924,388 | A | * | 8/1933 | Adams | B62D 63/061 280/80.1 |
| 2,020,766 | A | * | 11/1935 | Brown | B62B 3/02 280/639 |
| 2,320,189 | A | * | 5/1943 | McNamara, Jr. | B62D 63/061 280/142 |
| 2,523,790 | A | * | 9/1950 | Thiel | B62D 63/061 280/103 |
| 3,194,578 | A | * | 7/1965 | Kiecker | B62B 3/001 280/80.1 |
| 3,913,934 | A | * | 10/1975 | Koehn | B62D 21/14 280/656 |
| 4,397,476 | A | * | 8/1983 | Bolyard | B62D 63/061 280/149.2 |
| 5,249,823 | A | * | 10/1993 | McCoy | B62B 3/02 280/144 |
| 5,474,316 | A | | 12/1995 | Britton | |
| 5,810,378 | A | | 9/1998 | Brinkley | |
| 6,109,644 | A | * | 8/2000 | Cox | B62B 1/20 280/47.24 |
| 7,097,182 | B1 | * | 8/2006 | Liu | B62B 3/02 280/42 |

(Continued)

FOREIGN PATENT DOCUMENTS

| | | | | |
|---|---|---|---|---|
| EP | 0113154 A1 | * | 7/1984 | ........... B62D 63/061 |
| EP | 3132993 A1 | * | 2/2017 | ............... B62C 1/06 |
| GB | 2116488 A | * | 9/1983 | ........... B62D 63/061 |

*Primary Examiner* — Jacob B Meyer
(74) *Attorney, Agent, or Firm* — Sanchelima & Associates, P.A.; Christian Sanchelima; Jesus Sanchelima

(57) ABSTRACT

The disclosure presented herein relates to a trailer of a collapsible configuration. The trailer comprises a connector connectable to a vehicle. The trailer further comprises a frame structure coupled to the connector. The frame structure comprises a telescopic spine member, a pair of front members pivotally connected to the telescopic spine member and extending from the the telescopic spine member, a pair of lateral members pivotally connected to the pair of front members, a plurality of support members pivotally connected to and extending from the telescopic spine member and connected to the pair of lateral members. The pair of front members, the pair of lateral members, and the plurality of support members are pivotally coupled to the telescopic spine member, thereby providing a collapsible configuration to the trailer. This allows the maneuvering of the trailer in confined spaces.

9 Claims, 4 Drawing Sheets

(56) References Cited

U.S. PATENT DOCUMENTS

| | | | | |
|---|---|---|---|---|
| 7,770,913 B2* | 8/2010 | Cannon | ............... | B62B 1/12 |
| | | | | 280/656 |
| 8,567,518 B2* | 10/2013 | Arnold | ............... | A01B 73/067 |
| | | | | 172/311 |
| 9,834,263 B1* | 12/2017 | Nooren | ............... | B62D 21/14 |
| 9,969,227 B1* | 5/2018 | McNeave | ............... | B60F 3/0069 |
| 2007/0132208 A1* | 6/2007 | Winter | ............... | B62D 63/061 |
| | | | | 280/656 |
| 2009/0066061 A1* | 3/2009 | Winter | ............... | B62D 63/061 |
| | | | | 280/639 |
| 2015/0084359 A1* | 3/2015 | Frost | ............... | B62D 21/14 |
| | | | | 296/26.15 |
| 2017/0334493 A1* | 11/2017 | Nooren | ............... | B62D 63/061 |

\* cited by examiner

COLLAPSIBLE TRAILER

BACKGROUND OF THE INVENTION

1. Field of the Invention

The present disclosure relates to the field of trailers. In particular, the present disclosure relates to a trailer that can be coupled to a vehicle and has a collapsible configuration.

2. Description of the Related Art

A trailer is an unpowered vehicle that is typically coupled to a vehicle such as a tractor, a pick-truck, a truck, and the like. Trailers typically have a bulky and rigid configuration. This makes it difficult to maneuver the trailer in narrow or confined spaces, which is not desired.

Several designs for trailers have been designed in the past. None of them, however, are known to be specifically designed to be attachable to vehicles, while having a collapsible configuration for facilitating the maneuvering the trailer in confined or narrow spaces.

Applicant believes that a related reference corresponds to U.S. Pat. No. 5,474,316 filed by DANIEL W. BRITTON. The Britton reference discloses a trailer, for towing behind a bicycle, having an upper frame member, a lower frame member and a pair of folding frame units. The trailer, as disclosed in the Britton may also be modified for use as a stroller. However, the trailer disclosed in the Britton reference is configured for carrying one or more occupants or passengers thereon. The Britton reference fails to disclose a trailer that is attachable to vehicles, while having a collapsible configuration for facilitating the maneuvering the trailer in confined or narrow spaces.

Another related application is U.S. Pat. No. 5,810,378 filed by ROBERT S. BRINKLEY. The Brinkley reference discloses a collapsible trailer to be towed by a bicycle has front and rear U-shaped members pivotally mounted on an axle to the ends of which wheels can be attached. However, the Brinkley reference fails to disclose a trailer that is attachable to vehicles, while having a collapsible configuration for facilitating the maneuvering the trailer in confined or narrow spaces.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a trailer that is attachable to a vehicle such as a tractor, a truck, or a pickup truck.

It is yet another object of the present invention to provide a trailer having a collapsible configuration that facilitates the maneuvering the trailer in confined spaces.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
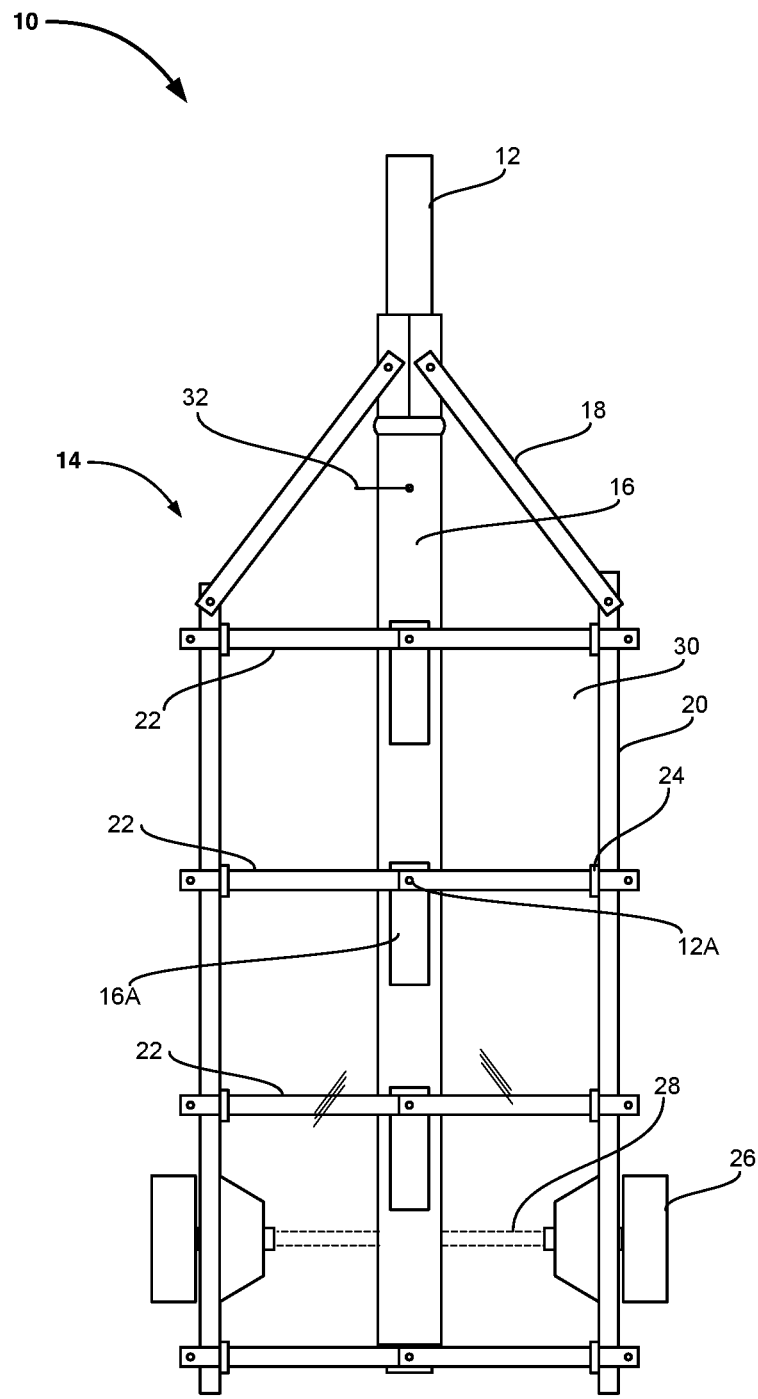
FIG. 1 illustrates a top view of a trailer 10, in accordance with an embodiment of the present invention, wherein the trailer 10 comprises a connector 12, a frame structure 14, a telescopic spine member 16, a pair of front members 18, a pair of lateral members 20, and a plurality of support members 22.
Figure 2:
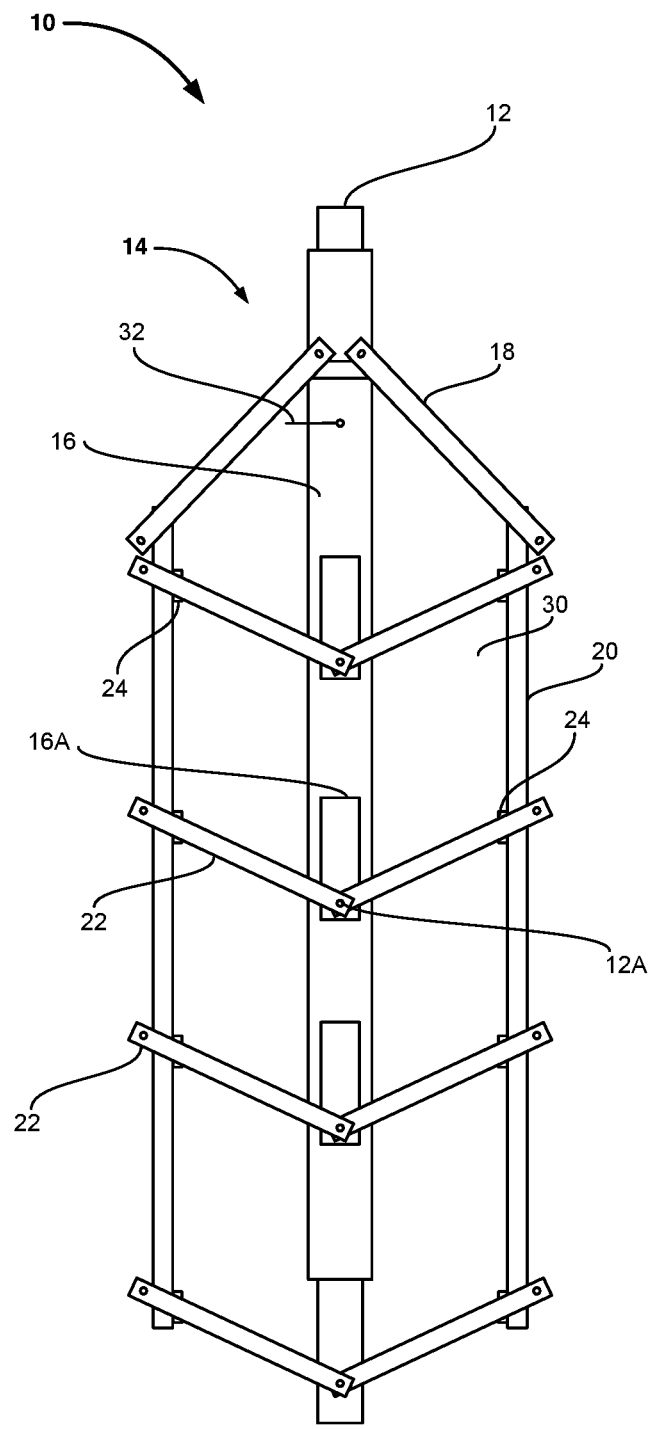
FIG. 2 illustrates another top view of a trailer 10, in accordance with an embodiment of the present invention, wherein the trailer 10 and the telescopic spine member 16 are retracted, and the trailer 10 is in its collapsed configuration.
Figure 3:
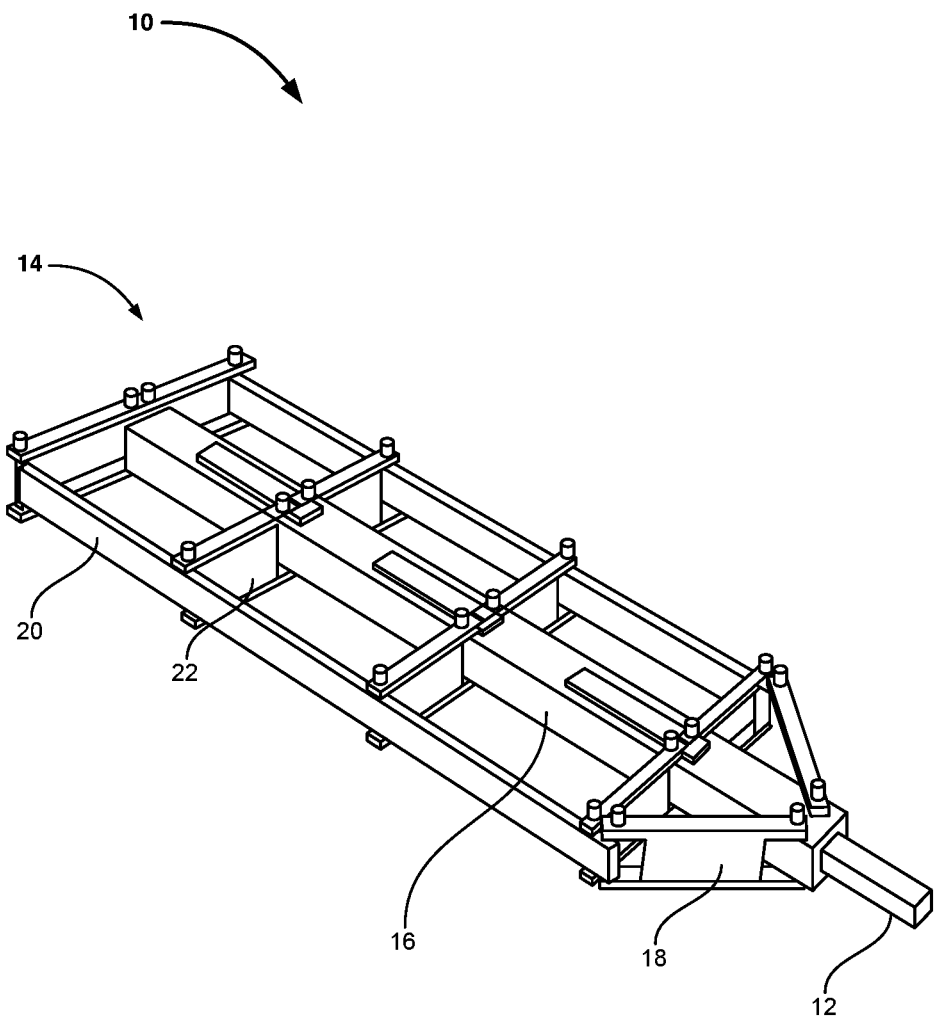
FIG. 3 illustrates an isometric view of the trailer 10, wherein the trailer 10 is in its expanded configuration.
Figure 4:
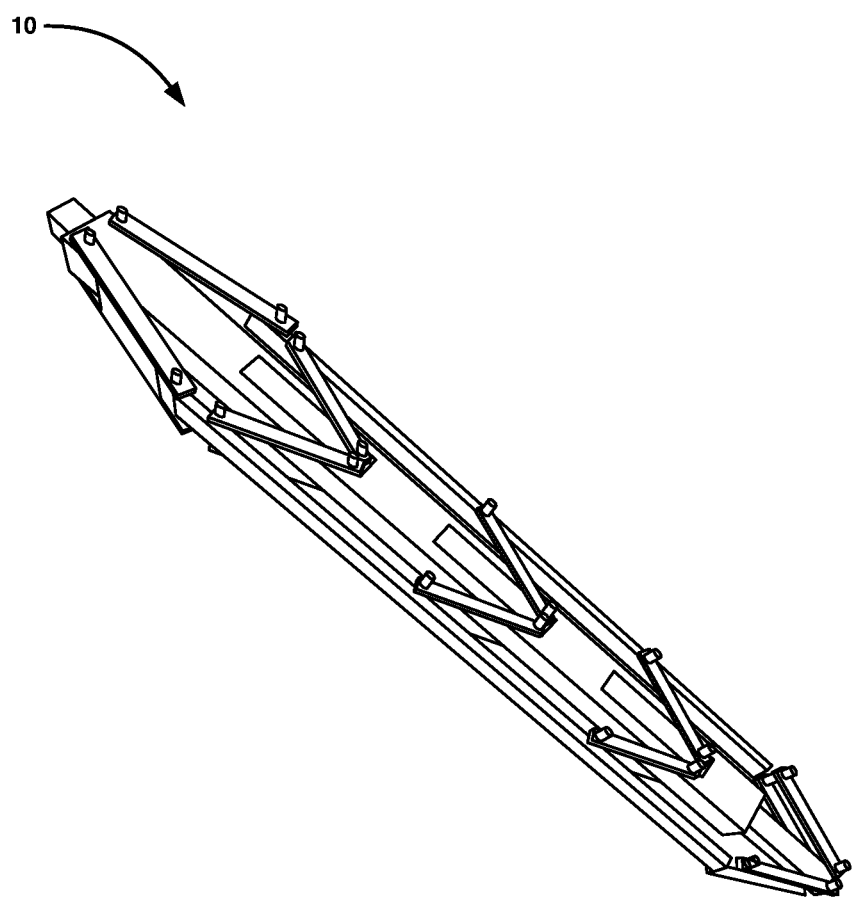
FIG. 4 illustrates another isometric view of the trailer 10, wherein the trailer 10 is in its collapsed configuration.

Referring now to FIG. 1 thru FIG. 4, where the present invention is generally referred to with numeral 10, it can be observed that a trailer 10, in accordance with an embodiment of the present invention, comprises a connector 12, a frame structure 14, a telescopic spine member 16, a pair of front members 18, a pair of lateral members 20, and a plurality of support members 22.

The connector 12 is the part of the trailer 10 that is connectable to a vehicle (not shown in figures). The vehicle can be any one of a car, a pickup truck, a tractor, a truck, or the like. The connector 12 forms an operative front portion of a frame structure 14. In one embodiment, the frame structure 14 is coupled to the connector 12.

The frame structure 14, in accordance with the present invention, has a collapsible configuration. The collapsible configuration of the frame structure 14 makes it possible for a user to maneuver the trailer 10 in confined and narrow spaces. The construction of the trailer 10, and more specifically, the construction of the frame structure 14 is described hereinafter.

The frame structure 14 comprises a telescopic spine member 16. The connector 12 is an elongate connector and extends into the telescopic spine member 16. Furthermore, the connector 12 is slidable within the telescopic spine member 16. The telescopic spine member 16 includes a plurality of slots 16A configured thereon. The slots 16A can be formed in a spaced apart manner on the telescopic spine member 16. As stated previously, the connector 12 is slidable within the telescopic spine member 16. The connector 12 comprises a plurality of pins 12A that are configured on the connector 12 to protrude through the plurality of slots 16A formed on the telescopic spine member 16.

The frame structure 14 further comprises a pair of front members 18. The pair of front members 18 are pivotally connected to the telescopic spine member 16 and extend with the the telescopic spine member 16. More specifically, the front members 18 extend angularly from the telescopic spine member 16 in a manner that the ends of the front members 18 are pivotally connected to the telescopic spine member 16 via hinges 24.

The frame structure 14 further comprises a pair of lateral members 20. The pair of lateral members 20 are pivotally connected to the pair of front members 18 via the hinges 24. The lateral members 20 form the outer edges of the frame structure 14.

The frame structure 14 further comprises a plurality of support members 22. The support members 22 are pivotally connected to and extend from the telescopic spine member 16 and connected to the pair of lateral members 20. More specifically, a first end of the support members 22 is pivotally connected to the telescopic spine member 16, and a second end of the support members 22 is pivotally connected to the lateral members via the hinges 24. The pivotal connection between the support members 22 and the telescopic spine member 16 is facilitated by the pins 12A. More specifically, the first ends of the support members 22 include an aperture within which the pins 12A are received. In an assembled configuration, the apertures on the support members are aligned and assembled onto the pin 12A.

The trailer 10 further comprises at least one pair of wheels 26 (as illustrated in FIG. 1). The wheels 26 are mounted on an axle 28. The axle 28, in accordance with one embodiment, is a telescopic axle. More specifically, the length of the axle 28 reduces when the trailer 10 is collapsed. In another embodiment, the wheels 26 can be mounted on a fixed hub without suspension.

The trailer 10 further comprises a floor 30 that is supported on the support members 22. In one embodiment, the floor 30 can be flexible such as a fabric floor or that of a harder material, as per the application requirements. The trailer 10 further comprises a pin 32 for holding the telescopic spine member 16 in a locked state either in its extended configuration or retracted configuration. In another embodiment, the floor 30 can be in two sections hinged on each lateral member 20 and configured for folding up and down and meeting together in the middle.

The operative configuration of the trailer 10 is hereinafter described. As seen in FIG. 1, the trailer 10 is in its operational state. The connector 12 is in its extended state when the trailer 10 is operational. In the operational state, the support members 22 are substantially perpendicular to the telescopic spine member 16, thereby increasing the surface area of the usable floor 30, which can be loaded with goods. When the user wishes to maneuver the trailer 10 through a narrow or a confined space, the connector 12 is retracted. The retraction of the connector 12 pushes the front members 18 inward, which causes the movement of the lateral members 20 inwards and also longitudinally in the direction of the connector 12. The movement of the lateral members 20 causes the support members to also be displaced inwards and also longitudinally in the direction of the connector 12, thereby collapsing the trailer 10, for allowing the trailer 10 to be collapsed and maneuvered in narrow and confined spaces.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A trailer comprising:
   a. a connector connectable to a vehicle;
   b. a frame structure coupled to said connector;
   c. a telescopic spine member;
   d. a pair of front members pivotally connected to said telescopic spine member and extending from said telescopic spine member;
   e. a pair of lateral members pivotally connected to said pair of front members;
   f. a plurality of support members pivotally connected to and extending from said telescopic spine member and connected to said pair of lateral members;
   g. wherein said pair of front members, said pair of lateral members, and said plurality of support members are pivotally coupled to said telescopic spine member, thereby providing a collapsible configuration to said trailer; and
   h. a first end of the support members is pivotally connected to the telescopic spine member, and a second end of the support member is pivotally connected to the lateral members, wherein the connector is slidable within the telescopic spine member.

2. The trailer as claimed in claim 1 wherein the telescopic spine member comprises a plurality of slots configured thereon.

3. The trailer as claimed in claim 2, wherein the connector includes a plurality of pins configured to protrude from the plurality of slots.

4. The trailer as claimed in claim 2, wherein the pivotal connection of the first end of the support members to the telescopic spine member is facilitated by the plurality of pins configured on the connector.

5. The trailer according to claim 1, further comprising a floor supported on the support members.

6. The trailer according to claim 1, further comprising at least one pair of wheels coupled to the frame structure.

7. The trailer according to claim 6, wherein the pair of wheels are mounted on an axle.

8. The trailer according to claim 7, wherein the axle has a telescopic configuration.

9. A trailer comprising:
   a. a connector connectable to a vehicle;
   b. a frame structure coupled to said connector;
   c. a telescopic spine member;
   d. a pair of front members pivotally connected to said telescopic spine member and extending from said telescopic spine member;
   e. a pair of lateral members pivotally connected to said pair of front members;
   f. a plurality of support members pivotally connected to and extending from said telescopic spine member and connected to said pair of lateral members;
   g. wherein said pair of front members, said pair of lateral members, and said plurality of support members are pivotally coupled to said telescopic spine member, thereby providing a collapsible configuration to said trailer;
   h. wherein a first end of the plurality of support members is pivotally connected to said telescopic spine member, and a second end of said plurality of support members is pivotally connected to said lateral members;
   i. wherein said connector is slidable within said telescopic spine member;
   j. wherein said telescopic spine member comprises a plurality of slots configured thereon;
   k. wherein said connector includes a plurality of pins configured to protrude from said plurality of slots, and wherein the pivotal connection of the first end of said plurality support members to said telescopic spine member is facilitated by said plurality of pins configured on said connector; and
   l. a floor supported on said plurality of support members.

* * * * *